United States Patent
Pan

(10) Patent No.: US 10,261,361 B1
(45) Date of Patent: Apr. 16, 2019

(54) BACKLIGHT MODULE, DISPLAY PANEL, DISPLAY DEVICE

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventor: Jianwei Pan, Beijing (CN)

(73) Assignees: BOE TECHNOLOGY GROUP CO., LTD., Beijing (CN); CHENGDU BOE OPTOELECTRONICS TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 16/013,028

(22) Filed: Jun. 20, 2018

(30) Foreign Application Priority Data

Oct. 12, 2017 (CN) .......................... 2017 1 0948682

(51) Int. Cl.
*G02F 1/1335* (2006.01)
(52) U.S. Cl.
CPC .. *G02F 1/133605* (2013.01); *G02F 1/133606* (2013.01); *G02F 1/133608* (2013.01); *G02F 2001/133607* (2013.01)

(58) Field of Classification Search
CPC ......... G02F 1/133605; G02F 1/133606; G02F 2001/133607
See application file for complete search history.

(56) References Cited

U.S. PATENT DOCUMENTS

| 7,038,246 B2 * | 5/2006 | Uemura ................ H01L 33/507 257/100 |
| 2017/0176663 A1 * | 6/2017 | Furuta .................... G02B 6/002 |

* cited by examiner

*Primary Examiner* — Donald L Raleigh
(74) *Attorney, Agent, or Firm* — Calfee, Halter & Griswold LLP

(57) ABSTRACT

A backlight module, a display panel and a display device. The backlight module includes a first light transmission substrate arranged on a light-emitting face. A projection of the first light transmission substrate on the light-emitting face coincides with the light-emitting face. A first reflection mirror and a second reflection mirror are also arranged on the first light transmission substrate. The first and second reflection mirrors are spaced apart and facing each other, and the second reflection mirror is arranged in such a way as to enable vertical emergent light on the light-emitting face to be incident to the first reflection mirror after undergoing a total reflection. The first reflection mirror is arranged in such a way as to enable light reflected by the second reflection mirror to exit after undergoing a total reflection. A plurality of light transmission holes are evenly distributed on the second reflection mirror.

17 Claims, 3 Drawing Sheets

BACKLIGHT MODULE, DISPLAY PANEL, DISPLAY DEVICE

RELATED APPLICATION

This application claims priority to the Chinese patent application No. 201710948682.2 filed on Oct. 12, 2017, and entire contents thereof are incorporated herein by reference.

TECHNICAL FIELD

The present disclosure relates to the technical field of displays, in to particular to a backlight module, a display panel and a display device.

BACKGROUND

In order to see clearly what is displayed on an LCD display, a backlight module is needed. The backlight module is an optical assembly inside of a liquid crystal display that includes such necessary optical components as a light source, film, reflector, back plate, etc. It is packaged by a glue frame.

SUMMARY

According to one aspect of the present disclosure, a backlight module provided, which comprises a light-emitting face with a lightproof adhesive tape provided at the edge thereof; a first light transmission substrate arranged on the light-emitting face and whose projection on the light-emitting face coincides with the light-emitting face; and a first reflection mirror and a second reflection mirror arranged on the first light transmission substrate, which are spaced apart and facing each other, wherein a projection of the first reflection mirror on the light-emitting face coincides with a projection of the lightproof adhesive tape on the light-emitting face, the second reflection mirror is arranged in such a way as to enable vertical emergent light on the light-emitting face to be incident to the first reflection mirror after undergoing a total reflection, and the first reflection mirror is arranged in such a way as to enable light reflected by the second reflection mirror to exit after undergoing a total reflection; and wherein a plurality of light transmission holes are evenly distributed on the second reflection mirror, whose directions of extension are perpendicular to the light-emitting face.

In some embodiments, the first reflection mirror and the second reflection mirror are arranged to be parallel to each other, and both the first reflection mirror and the second reflection mirror form an included angle of 45 degrees with the light-emitting face.

In some embodiments, the backlight module further comprises: a second light transmission substrate, whose projection on the light-emitting face coincides with the projection of the first light transmission substrate on the light-emitting face, and the first reflection mirror and the second reflection mirror are arranged between the first light transmission substrate and the second light transmission substrate.

In some embodiments, a first prism and a second prism are arranged between the first light transmission substrate and the second light transmission substrate, whose cross sections have the shape of an isosceles right triangle, said first prism and second prism being spaced apart and having their bottoms facing each other, and the bottoms being used as the first reflection mirror and the second reflection mirror, respectively; and wherein one side of the first prism contacts the first light transmission substrate, and its projection on the light-emitting face coincides with the projection of the lightproof adhesive tape on the light-emitting face; and one side of the second prism contacts the second light transmission substrate, and a plurality of light transmission holes are evenly distributed on the second prism.

In some embodiments, scattered particles are evenly distributed in the second light transmission substrate.

In some embodiments, the scattered particles are made of metal oxides.

In some embodiments, both the first light transmission substrate and the second light transmission substrate are made of hard light transmission materials and have a light transmittance of above 90%.

In some embodiments, the backlight module comprises a back plate with multiple scattered netted dots arranged thereon, and the number of the light transmission holes is proportional to the number of the scattered netted dots.

According to another aspect of the present disclosure, a display panel is also provided, which comprises the backlight module described in any one of the embodiments above.

According to still another aspect of the present disclosure, a display device is further provided, which comprises the display panel as described above.

BRIEF DESCRIPTION OF THE DRAWINGS

In order to describe the technical solutions in the embodiments of the present disclosure more clearly, the drawings that need to be used for the description will be introduced briefly below. Apparently, the drawings in the descriptions below are merely some of the embodiments of the present disclosure. Those skilled in the art can obtain other drawings from these drawings.

DETAILED DESCRIPTION

To further clarify the objects, technical solutions and advantages of the present disclosure, a more particular description of the present disclosure is rendered below in conjunction with specific embodiments and with reference to the drawings.

It shall be noted that the wordings "first" and "second" used in the embodiments of the present disclosure are to distinguish different entities or different parameters of two identical names. Therefore, the wordings "first" and "second are only used for facilitating description, but they should not be interpreted as limiting the embodiments of the present disclosure.

Figure 1:
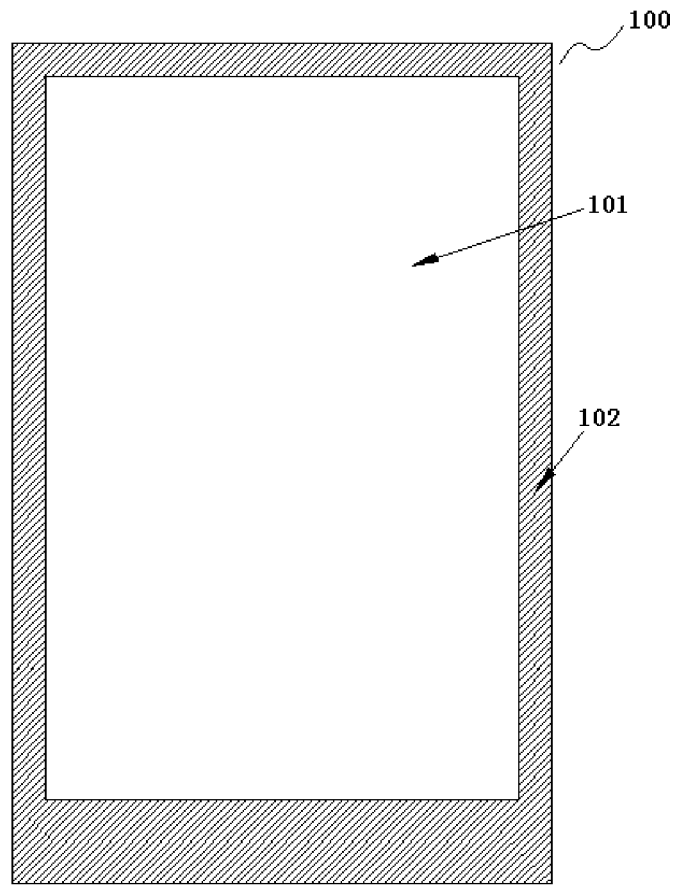
FIG. 1 is a schematic drawing of a light-emitting face of a backlight module of the related art.

FIG. 1 is a schematic drawing of a light-emitting face of a backlight module of the related art. Referring to FIG. 1, a lightproof adhesive tape 102 is arranged at the edge of a glue frame of a backlight module 100. On a light-emitting face 101 of the backlight module 100, since the lightproof adhesive tape 102 has a certain width, it will occupy the edge of the light-emitting face 101, so that the light-emitting area of the light-emitting face 101 is only the area surrounded by the lightproof adhesive tape 102. As a result, the effect of frameless light emission cannot be achieved.

Figure 2:
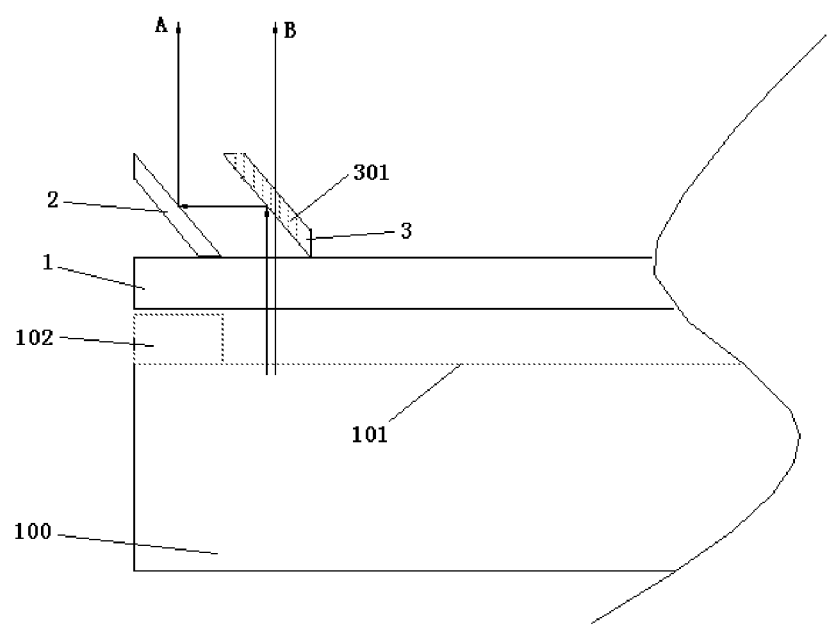
FIG. 2 is a schematic structural diagram of a backlight module according to an embodiment of the present disclosure.

FIG. 2 is a schematic structural diagram of a backlight module according to an embodiment of the present disclosure. Referring to FIG. 2, the backlight module described in this embodiment comprises: a first light transmission substrate 1 arranged on the light-emitting face 101, a projection of the first light transmission substrate 1 on the light-emitting face coinciding with the light-emitting face; and a first reflection mirror 2 and a second reflection mirror 3 arranged on the first light transmission substrate 1, which are spaced apart and facing each other.

The first light transmission substrate 1 is arranged on the surface of the light-emitting face 101, with its shape and size being adapted to the light-emitting face 101, so that its projection coincides with the surface of the light-emitting face 101. In addition, the first light transmission substrate 1 is made of a hard light transmission material. The first hard light transmission substrate 1 carries the first reflection mirror 2 and the second reflection mirror 3 thereon, meanwhile, it can enable the light emitted from the light-emitting face 101 to penetrate through the first light transmission substrate 1 and irradiate on the first reflection mirror 2 and the second reflection mirror 3 because of its light transmission property.

The first reflection mirror 2 and the second reflection mirror 3 are spaced apart and facing each other on the first light transmission substrate 1. The first reflection mirror 2 is arranged in such a way as that its projection on the light-emitting face 101 coincides with the projection of the lightproof adhesive tape 102 on the light-emitting face 101, namely, viewing from a direction perpendicular to the light-emitting face 101, the first reflection mirror 2 can completely cover the lightproof adhesive tape 102. The second reflection mirror 3 is arranged at an inner side of the first reflection mirror 2 (near a center of the light-emitting face 101) and is at a certain distance from the first reflection mirror 2.

The first reflection mirror 2 and the second reflection mirror 3 are both arranged at a certain angle to the light-emitting face 101. Specifically, the vertical emergent light emitted from the projection position corresponding to the second reflection mirror 3 on the light-emitting face 101 will irradiate on the second reflection mirror 3. The second reflection mirror 3 is arranged at a certain angle to the light-emitting face 101, such that the second reflection mirror 3 enables the vertical emergent light emitted from the projection position corresponding to the second reflection mirror 3 on the light-emitting face 101 to be incident on the first reflection mirror 2 after undergoing a total reflection. The first reflection mirror 2 is arranged at a certain angle to the light-emitting face 101, such that the first reflection mirror 2 enables the incident light to undergo a total reflection again and then exit along an emitting direction of the light-emitting face 101 (a direction perpendicular to the light-emitting face 101), as shown by light A in FIG. 2. A plurality of light transmission holes 301 are evenly distributed on the second reflection mirror 3, whose directions of extension are perpendicular to the light-emitting face 101. A part of the vertical emergent light emitted from the projection position corresponding to the second reflection mirror 3 on the light-emitting face 101 will propagate through the light transmission holes 301 along the original propagation path, as shown by light B in FIG. 2.

It can be seen that in the backlight module of the present embodiment, by means of the two times of total reflection on the first reflection mirror 2 and the second reflection mirror 3, a part of the emergent light on the light-emitting face 101 is directed to the position corresponding to the lightproof adhesive tape 102 to exit, so that the light-emitting area on the light-emitting face 101 expands to the part covered by the lightproof adhesive tape 102. As far as the visual effect is concerned, the entire light-emitting face 101 is emitting light, thereby realizing frameless light emission.

In this embodiment, the specific degrees of the angles formed from the first reflection mirror 2 and the second reflection mirror 3 to the light-emitting face 101 can be selected flexibly as desired, as long as the corresponding incident light can be totally reflected. In certain exemplary embodiments, referring to FIG. 2, the first reflection mirror 2 and the second reflection mirror 3 are parallel to each other, and they both form an angle of 45° with the light-emitting face 101.

In this embodiment, the first reflection mirror 2 and the second reflection mirror 3 can be fixed on the first light transmission substrate 1 through adhering, an auxiliary fixing member or other common fixing and connecting means.

Figure 3:
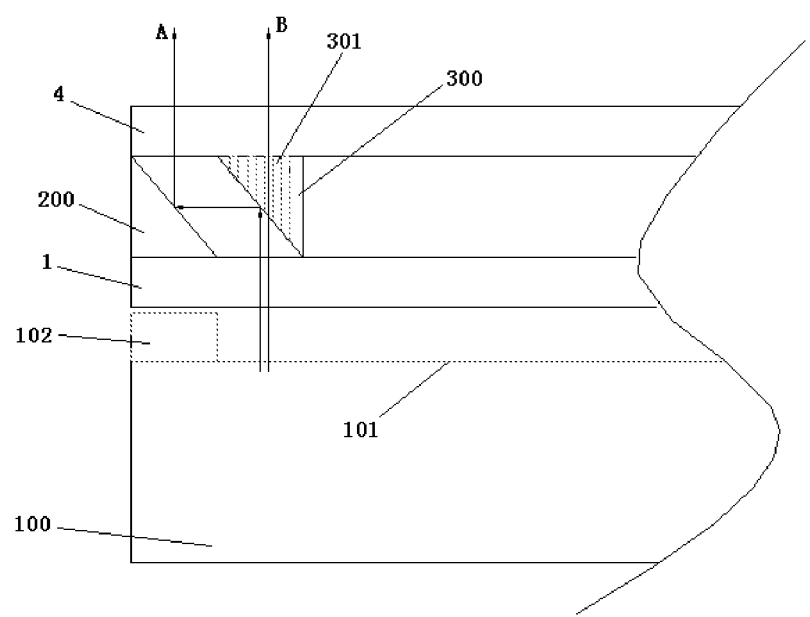
FIG. 3 is a schematic structural diagram of a backlight module according to another embodiment of the present disclosure.

In another embodiment, referring to FIG. 3, the backlight module may further comprise a second light transmission substrate 4, whose projection on the light-emitting face coincides with the projection of the first light transmission substrate 1 on the light-emitting face. The shape and size of the second light transmission substrate 4 are adapted to the first light transmission substrate 1. A first prism 200 and a second prism 300 are arranged between the first light transmission substrate 1 and the second light transmission substrate 4, whose cross sections have the shape of an isosceles right triangle. The first light transmission substrate 1 and the second light transmission substrate 4 are both made of a hard light transmission material. The first light transmission substrate 1 carries the first prism 200 and the second prism 300, while the second light transmission substrate 4 protects the first prism 200 and the second prism 300 from the outside. In addition, considering the effect of light transmission, the first light transmission substrate 1 and the second light transmission substrate 4 both have a light transmittance of above 90%.

The first prism 200 and the second prism 300 are spaced apart with their bottoms facing each other. Specifically, the bottom of the first prism 200 (i.e. the bottom facing the angle formed by the two orthogonal sides of the prism) faces the bottom of the second prism 300, and they correspond to the first reflection mirror and the second reflection mirror mentioned in the above embodiment, respectively.

One side of the first prism 200 contacts the first light transmission substrate 1, and its projection on the light-emitting face 101 coincides with the projection of the lightproof adhesive tape 102 on the light-emitting face 101, i.e. viewing from the direction perpendicular to the light-emitting face 101, this side of the first prism 200 can completely cover the lightproof adhesive tape 102. One side of the second prism 300 contacts the second light transmission substrate 4. The cross sections of the first prism 200 and the second prism 300 have the shape of an isosceles right triangle, so the facing bottoms of the first prism 200 and the second prism 300 both form an angle of 45 degrees with the light-emitting face 101. Based on such a structure, the bottom of the second prism 300 enables the vertical emergent light emitted from the projection position corresponding to the second prism 300 on the light-emitting face 101 to be incident on the bottom of the first prism 200 after being totally reflected. The bottom of the first prism 200 enables the incident light to be totally reflected again and then exit along the emitting direction of the light-emitting face 101, as shown by light A in FIG. 3. A plurality of light transmission holes 301 are evenly distributed on the second prism 300, whose directions of extension are perpendicular to the light-emitting face 101. A part of the vertical emergent light emitted from the projection position corresponding to the second prism 300 on the light-emitting face 101 will propagate through the light transmission holes 301 along the original propagation path, as shown by light B in FIG. 3.

In this embodiment, some scattered particles can be evenly distributed in the second light transmission substrate 4. The scattered particles can make light passing through the second light transmission substrate 4 to scatter, so that the light emitted from the entire backlight module 100 looks softer and more uniform. The scattered particles are made of metal oxides, such as titanium dioxide, barium sulfate, magnesium oxide, silicon oxide, zinc oxide, lithopone or zirconia.

In certain exemplary embodiments, the backlight module comprises a back plate with multiple scattered netted dots arranged thereon, the netted dots make the light to scatter and then exit from the light-emitting face, thereby increasing brightness of the backlight module. In the backlight module of the embodiment of the present disclosure, the number of the light transmission holes on the second reflection mirror is arranged to be proportional to the number of the scattered netted dots in the backlight module. When the number of scattered netted dots is large, the number of the light transmission holes should increase correspondingly, so that enough light can be directed to the position corresponding to the lightproof adhesive tape to be emitted, besides, while realizing frameless light emission, non-uniform light emission at different areas of the backlight module can be avoided.

It shall be noted that FIG. 2 and FIG. 3 only show positions of an edge and an end of the backlight module 100. The backlight module 100 usually has a fixed shape (rectangle), and the projection of the first reflection mirror 2 on the light-emitting face coincides with the projection of the lightproof adhesive tape 102 on the light-emitting face, so those skilled in the art shall understand that the structure as described in this embodiment exists on all edge positions of the light-emitting face 101 of the backlight module 100.

Based on the same inventive concept, an embodiment of the present disclosure further provides a display panel, which comprises the backlight module provided in any of the above embodiments.

In the display panel provided in the present embodiment, the technical effect of frameless light emission of the backlight module is achieved by means of the backlight module described in any of the above embodiments of the present disclosure.

The display panel can be applied to a liquid crystal television and a liquid crystal display, moreover, it can be applied to display devices that need backlight, such as digital photo frames, electronic paper, mobile phones, etc.

Based on the same inventive concept, an embodiment of the present disclosure further provides a display device, which comprises the display panel described in the above embodiment.

In the display device provided in this embodiment, by using the display panel described in the above embodiment of the present disclosure, the display effect of the display device is significantly improved owing to the effect of frameless light emission of the backlight module in the display panel.

The display device can be any product or component with a display function, such as liquid crystal panel, electronic paper, mobile phone, tablet PC, television, display, laptop, digital photo frame, navigator, etc.

Those skilled in the art shall understand that any of the above embodiments is only discussed as an example, but it does not intend to mean that the scope (including the claims) of the present disclosure is limited within these examples. Technical features in different embodiments can be combined, and the sequence of carrying out the steps is not restrictive.

The embodiments of the present disclosure intend to encompass all replacements, modifications and variations that fall into the wide scope of the appended claims. Therefore, any omission, modification, equivalent replacement, improvement and so on made under the spirit and principle of the present disclosure shall fall into the protection scope of the present disclosure.

The invention claimed is:

1. A backlight module, comprising:
   a light-emitting face with a lightproof adhesive tape provided at an edge of the light-emitting face;
   a first light transmission substrate arranged on the light-emitting face, wherein a projection of the first light transmission substrate on the light-emitting face coincides with the light-emitting face; and
   a first reflection mirror and a second reflection mirror, wherein the first and second reflection mirrors are arranged on the first light transmission substrate and are spaced apart and facing each other, wherein a projection of the first reflection mirror on the light-emitting face coincides with a projection of the lightproof adhesive tape on the light-emitting face, wherein the second reflection mirror is arranged in such a way as to enable vertical emergent light on the light-emitting face to be incident to the first reflection mirror after undergoing a total reflection, and wherein the first reflection mirror is arranged in such a way as to enable light reflected by the second reflection mirror to exit after undergoing a total reflection; and
   wherein a plurality of light transmission holes are evenly distributed on the second reflection mirror, and directions of extension of the light transmission holes are perpendicular to the light-emitting face.

2. The backlight module according to claim 1, wherein the first reflection mirror and the second reflection mirror are arranged to be parallel to each other, and both the first reflection mirror and the second reflection mirror form an included angle of 45° with the light-emitting face.

3. The backlight module according to claim 2, further comprising a second light transmission substrate,
   wherein a projection of the second light transmission substrate on the light-emitting face coincides with the projection of the first light transmission substrate on the light-emitting face, and
   wherein the first reflection mirror and the second reflection mirror are arranged between the first light transmission substrate and the second light transmission substrate.

4. The backlight module according to claim 3, further comprising a first prism and a second prism;
   wherein the first and second prism are arranged between the first light transmission substrate and the second light transmission substrate,
   wherein cross sections of the first and second prisms have the shape of an isosceles right triangle;
   wherein the first prism and second prism are spaced apart and having their bottoms facing each other;

wherein the bottoms of the first and second prisms are used as the first reflection mirror and the second reflection mirror respectively; and wherein one side of the first prism contacts the first light transmission substrate, and its projection on the light-emitting face coincides with the projection of the lightproof adhesive tape on the light-emitting face;

wherein one side of the second prism contacts the second light transmission substrate; and wherein a plurality of light transmission holes are evenly distributed on the second prism.

5. The backlight module according to claim 3, wherein scattered particles are evenly distributed in the second light transmission substrate.

6. The backlight module according to claim 5, wherein the scattered particles are made of metal oxides.

7. The backlight module according to claim 3, wherein both the first light transmission substrate and the second light transmission substrate are made of hard light transmission materials and have a light transmittance of above 90%.

8. The backlight module according to claim 1, wherein the backlight module further comprises a back plate with multiple scattered netted dots arranged thereon, and the number of the light transmission holes is proportional to the number of the scattered netted dots.

9. A display panel, comprising the backlight module according to claim 1.

10. The display panel according to claim 9, wherein the first reflection mirror and the second reflection mirror are arranged to be parallel to each other, and both the first reflection mirror and the second reflection mirror form an included angle of 45° with the light-emitting face.

11. The display panel according to claim 10, wherein the backlight module further comprises a second light transmission substrate, wherein a projection of the second light transmission substrate on the light-emitting face coincides with the projection of the first light transmission substrate on the light-emitting face, and wherein the first reflection mirror and the second reflection mirror are arranged between the first light transmission substrate and the second light transmission substrate.

12. The display panel according to claim 11, further comprising a first prism and a second prism;

wherein the first and second prism are arranged between the first light transmission substrate and the second light transmission substrate, wherein cross sections of the first and second prisms have the shape of an isosceles right triangle;

wherein the first prism and second prism are spaced apart and having their bottoms facing each other;

wherein the bottoms of the first and second prisms are used as the first reflection mirror and the second reflection mirror respectively; and wherein one side of the first prism contacts the first light transmission substrate, and its projection on the light-emitting face coincides with the projection of the lightproof adhesive tape on the light-emitting face;

wherein one side of the second prism contacts the second light transmission substrate; and wherein a plurality of light transmission holes are evenly distributed on the second prism.

13. The display panel according to claim 11, wherein scattered particles are evenly distributed in the second light transmission substrate.

14. The display panel according to claim 13, wherein the scattered particles are made of metal oxides.

15. The display panel according to claim 11, wherein both the first light transmission substrate and the second light transmission substrate are made of hard light transmission materials and have a light transmittance of above 90%.

16. The display panel according to claim 9, wherein the backlight module further comprises a back plate with multiple scattered netted dots arranged thereon, and the number of the light transmission holes is proportional to the number of the scattered netted dots.

17. A display device, which comprises the display panel according to claim 9.

* * * * *